United States Patent
Pignorel et al.

(10) Patent No.: US 9,992,611 B2
(45) Date of Patent: Jun. 5, 2018

(54) COMMUNICATION PORTABLE DEVICE AND COMMUNICATION METHOD

(71) Applicant: NXP B.V., Eindhoven (NL)

(72) Inventors: Arnaud Pignorel, Verson (FR); Alexis Watine, Colombelles (FR)

(73) Assignee: NXP B.V., Eindhoven (NL)

( * ) Notice: Subject to any disclaimer, the term of this patent is extended or adjusted under 35 U.S.C. 154(b) by 0 days. days.

(21) Appl. No.: 14/791,224

(22) Filed: Jul. 2, 2015

(65) Prior Publication Data

US 2016/0007143 A1    Jan. 7, 2016

(30) Foreign Application Priority Data

Jul. 3, 2014   (EP) ..................................... 14290196

(51) Int. Cl.
*H04W 4/00* (2009.01)
*H04B 5/00* (2006.01)
*H04M 1/725* (2006.01)

(52) U.S. Cl.
CPC .......... *H04W 4/008* (2013.01); *H04B 5/0031* (2013.01); *H04M 1/7253* (2013.01); *H04M 1/72569* (2013.01); *H04M 2250/04* (2013.01); *H04M 2250/12* (2013.01)

(58) Field of Classification Search
USPC ...... 455/41.1, 41.2; 340/10.1–10.3; 235/435, 235/439
See application file for complete search history.

(56) References Cited

U.S. PATENT DOCUMENTS

| | | | |
|---|---|---|---|
| 6,577,238 B1 * | 6/2003 | Whitesmith | G01S 13/878 340/10.1 |
| 7,904,022 B2 * | 3/2011 | Takada | G06K 17/0022 340/10.1 |
| 7,986,917 B2 | 7/2011 | Ahlgren et al. | |
| 8,579,196 B1 * | 11/2013 | Lowe | G06K 7/1456 235/435 |
| 8,994,504 B1 * | 3/2015 | Schatz | G06K 7/10009 340/10.1 |
| 9,270,803 B2 | 2/2016 | Qing et al. | |

(Continued)

FOREIGN PATENT DOCUMENTS

| | | |
|---|---|---|
| CN | 101491066 A | 7/2009 |
| CN | 102594981 A | 7/2012 |

(Continued)

OTHER PUBLICATIONS

Extended European Search Report for Patent Appln. No. 14290196.6 (dated Jan. 5, 2015).

(Continued)

*Primary Examiner* — Nay A Maung
*Assistant Examiner* — Erica Fleming-Hall

(57) ABSTRACT

A method for managing the communication between a communication portable device (200) including a NFC device and a NFC tag (100) including a plurality of information, comprises comprising determining a position and/or orientation of the communication portable device (200) and enabling the communication portable device to read a portion of the plurality of information units, depending on the position and/or orientation of the communication portable device.

8 Claims, 4 Drawing Sheets

(56) References Cited

U.S. PATENT DOCUMENTS

| | | | | |
|---|---|---|---|---|
| 2006/0237546 | A1* | 10/2006 | Lapstun | G06F 3/014 235/494 |
| 2007/0222602 | A1* | 9/2007 | Luo | G06K 7/10178 340/572.7 |
| 2011/0208474 | A1* | 8/2011 | Tanabiki | G01S 5/0226 702/150 |
| 2012/0089299 | A1* | 4/2012 | Breed | B60C 11/24 701/36 |
| 2012/0133487 | A1* | 5/2012 | Murofushi | G06K 7/10079 340/8.1 |
| 2012/0157006 | A1* | 6/2012 | Hong | H01Q 1/2225 455/67.14 |
| 2013/0060520 | A1* | 3/2013 | Amor | G01S 5/0018 702/154 |
| 2013/0069988 | A1* | 3/2013 | Kamei | G06F 1/1637 345/658 |
| 2013/0084801 | A1* | 4/2013 | Royston | G06K 7/015 455/41.1 |
| 2013/0153650 | A1* | 6/2013 | Clayton | G06Q 10/063112 235/375 |
| 2013/0169415 | A1* | 7/2013 | Bellows | G06K 7/0008 340/10.1 |
| 2013/0181050 | A1* | 7/2013 | McConnell | G06K 7/0004 235/440 |
| 2013/0257595 | A1* | 10/2013 | Trosken | G01S 5/0247 340/10.1 |
| 2013/0265502 | A1* | 10/2013 | Huebner | G06T 15/20 348/789 |
| 2015/0084744 | A1* | 3/2015 | Havens | G06K 7/10356 340/10.3 |

FOREIGN PATENT DOCUMENTS

| | | |
|---|---|---|
| EP | 2 493 160 A1 | 8/2012 |
| WO | 2012/159673 A1 | 11/2012 |
| WO | 2013/027077 A1 | 2/2013 |
| WO | WO 2013027077 A1 * | 2/2013 ............ G06F 3/017 |

OTHER PUBLICATIONS

Office Action for CN Counterpart Appln. No. 201510387576.2 (dated Jan. 8, 2018).

\* cited by examiner

COMMUNICATION PORTABLE DEVICE AND COMMUNICATION METHOD

CROSS-REFERENCE TO RELATED APPLICATIONS

This application claims the priority under 35 U.S.C. § 119 of European patent application no. 14290196.6, filed on Jul. 3, 2014, the contents of which are incorporated by reference herein.

FIELD OF THE INVENTION

The present invention relates to a communication portable device and a communication method. More particularly the present invention relates to communication portable devices and communication methods which uses the Near Field Communication (NFC) technology.

BACKGROUND OF THE INVENTION

NFC technology is commonly available and used for contactless exchange of information between portable devices, for example personal digital assistants like smartphones, and NFC tags including one or more information. According to the NFC standard, information is presented as NDEF ("NFC Data Exchange Format") codes. Transmission of information between NFC device and tag normally occurs when they are brought at a relative distance of 4 cm or less.

It is also possible that a plurality of NFC tags are arranged in structures like panels, walls, or totems, in order to make a greater number of information available to a user of the portable device.

Normally all the information available in one or more NFC tags are transferred to the NFC device when the latter is put within 4 cm from the tag or tags containing the information. This can result in an excessive consumption of the device resources, e.g. of memory, thus limiting the number of possible information which can be embedded in the NFC tag.

Methods for choosing between multiple available information have been already developed and described.

WO 2012/159673 shows that different information, for example user's manual instructions, is presented to a user of a mobile device when reading a single NFC tag, depending on which application is active at the moment of reading.

US 2013/0153650 discloses that different information could be presented to a user when reading a single RFID tag depending on context, e.g. time of day, location etc.

US 2013/0181050 presents a method where a predetermined gesture, e.g. shake or tilt, is used to select which type of tag is going to be read.

Methods are also known for making the exchanged information dependent from the orientation of the portable device.

For example, EP 2493160 discloses a method wherein a mobile phone uses its accelerometer to determine its absolute orientation while reading an NFC tag to determine data transfer direction between the mobile phone and the NFC tag. Depending on the orientation communication is established or not. No selection of the information is provided by the method.

U.S. Pat. No. 8,579,196, instead, shows that the relative orientation between a scanned NFC tag and a mobile phone is used to interpret the scanned information. The mobile phone interprets the same tag as a plurality of tags, depending on an angle between the tag and an axis of the mobile phone. However, according to U.S. Pat. No. 8,579,196, the entire information included in the tag is transferred to the mobile phone, only its interpretation depending from the relative orientation. In other words, the method, rather than providing for a selection among a plurality of information, provides for a concise system of having in a single tag a plurality of information which should otherwise presented in a plurality of tags, each differing from the others for a respective angle of rotation with respect to a common reference.

OBJECT AND SUMMARY OF THE INVENTION

It may be an object of the present invention to provide a method for optimally selecting among a plurality of information available on a single NFC tag, in order that a desired portion of the information is transferred to a communication portable device.

In order to achieve the objects defined above, a method for managing the communication between a communication portable device including a NFC device and a NFC tag including a plurality of information is provided. A communication portable device including a controller for implementing the method of the present invention is also provided. The dependent claims describe advantageous developments and modifications of the invention.

According to a first expect of the present invention, a method for managing the communication between a communication portable device including a NFC device and a NFC tag including a plurality of information, the method comprising determining a position and/or orientation of the communication portable device and enabling the communication portable device to read a portion of the plurality of information unit, depending on the position and/or orientation of the communication portable device.

With "communication portable device" it is meant a personal digital assistant (PDA), smartphone, tablet, MPEG player or similar. In general the expression "communication portable device" may include any device which could be handle by a single user and which can establish a communication with at least another device, for example with a NFC tag.

With "information unit" it is meant any piece of information which can be read by a NFC device, in particular a NDEF code. According to exemplary embodiments of the present invention, each NDEF code may correspond to an application or function to be executed on a communication portable device.

A plurality of information can be embedded in a NFC tag, for example a plurality of NDEF codes.

According to exemplary embodiments of the present invention, the method performs the following sequence of steps:
  it recognizes the number of information units included in the NFC tag,
  it discretizes a round angle, in the surface where the NFC tag is lying, in a plurality of angular sectors, the number of angular sectors being equal to the number of information units comprised in the NFC tag,
  it associating each angular sector to one information unit,
  it recognizes the angular sector towards which the axis of the communication portable device is oriented,
  it finally reads the information unit associated to the recognized angular sector.

According to a second expect of the present invention, a communication portable device includes:

a NFC device configured for reading a plurality of information from a NFC tag, a sensor for determining a position and/or orientation of the communication portable device, a controller associated with the NFC device for enabling said NFC device to read a portion of the plurality of information, depending on the position and/or orientation of the communication portable device.

According to a further expect of the present invention, a communication system including a communication portable device according to claim 1 and at least a NFC tag including a plurality of information.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DESCRIPTION OF EMBODIMENTS

Figure 1:
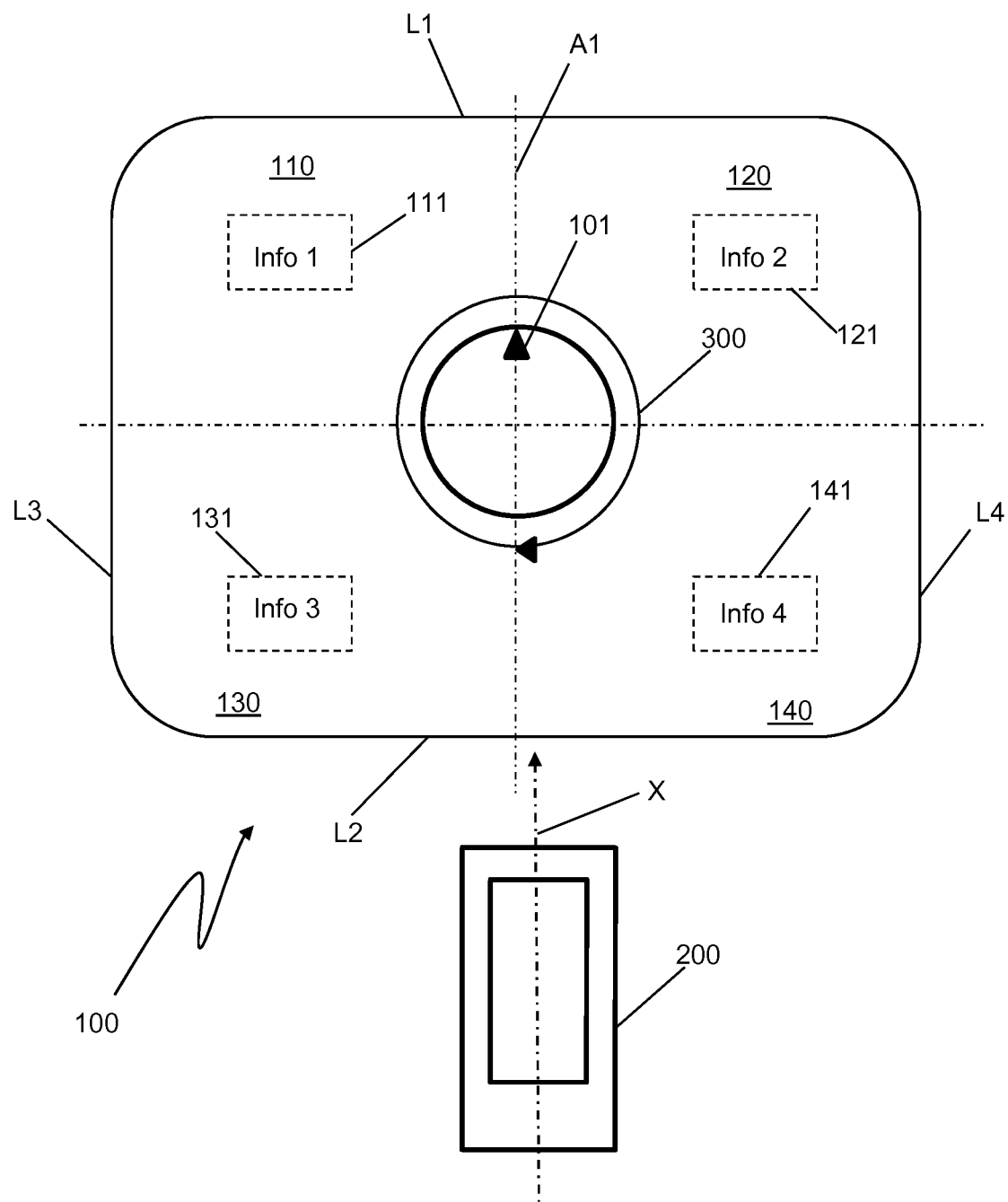
FIG. 1 shows a schematical view of a system including a communication portable device and an NFC tag according to present invention.
Figure 2:
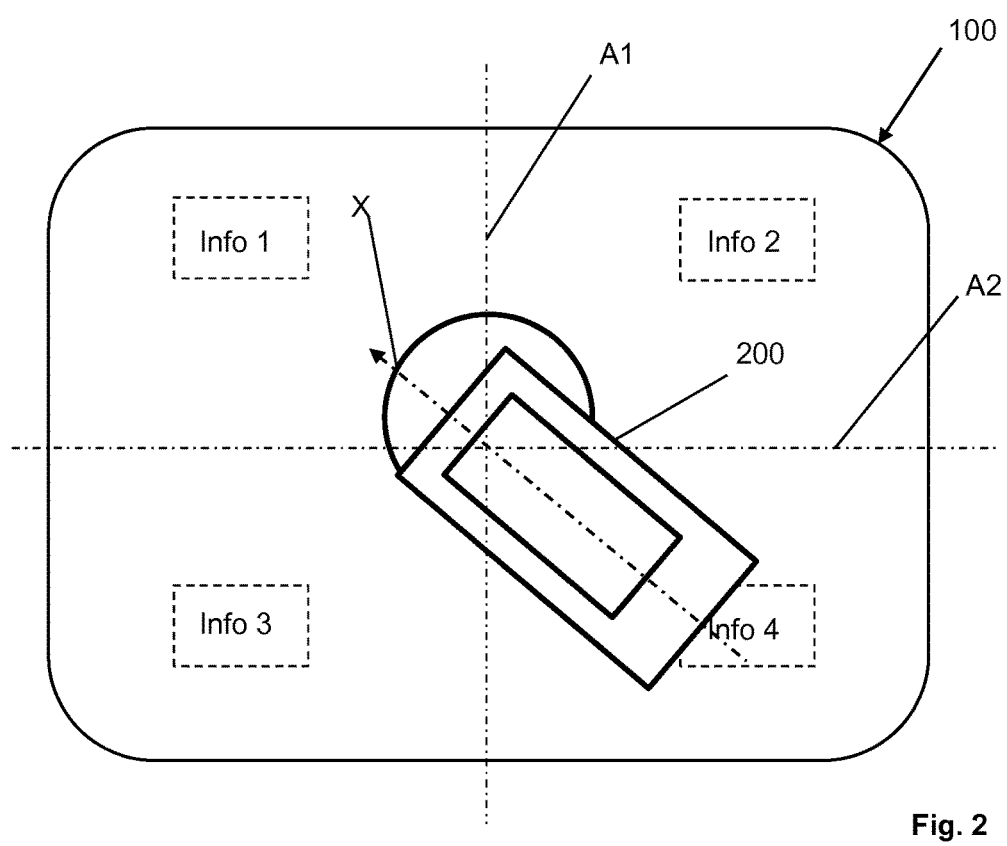
FIGS. 2 to 5 show the system of FIG. 1 in four respective operative configurations.
Figure 3:
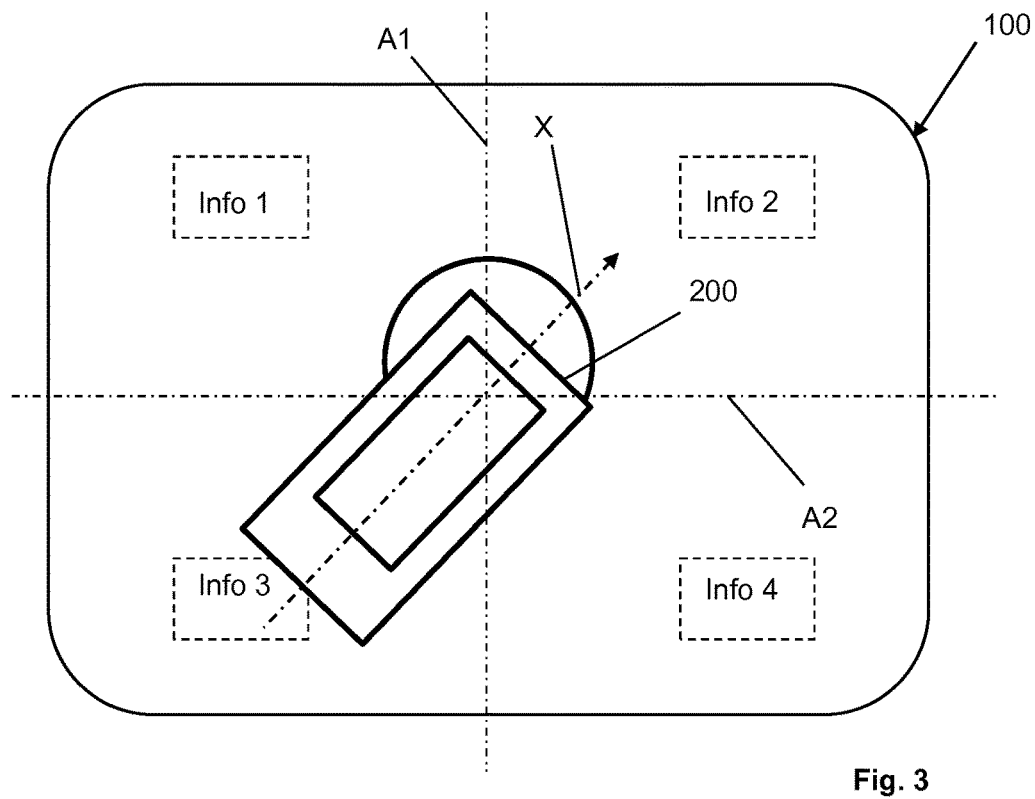
Figure 4:
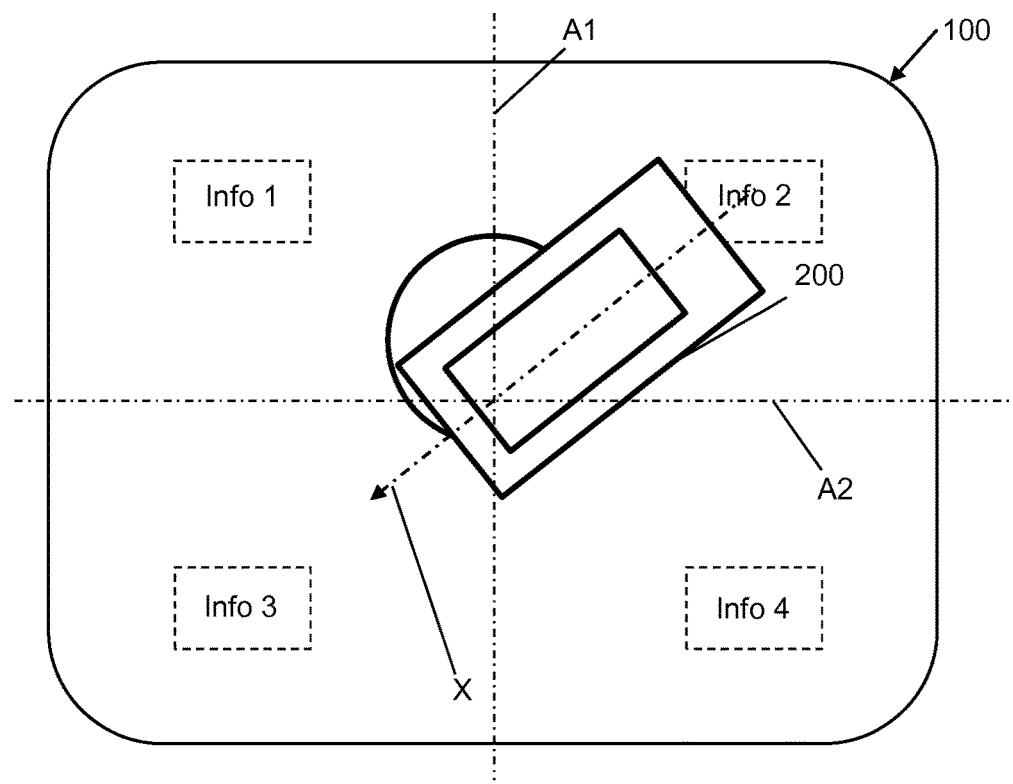
Figure 5:
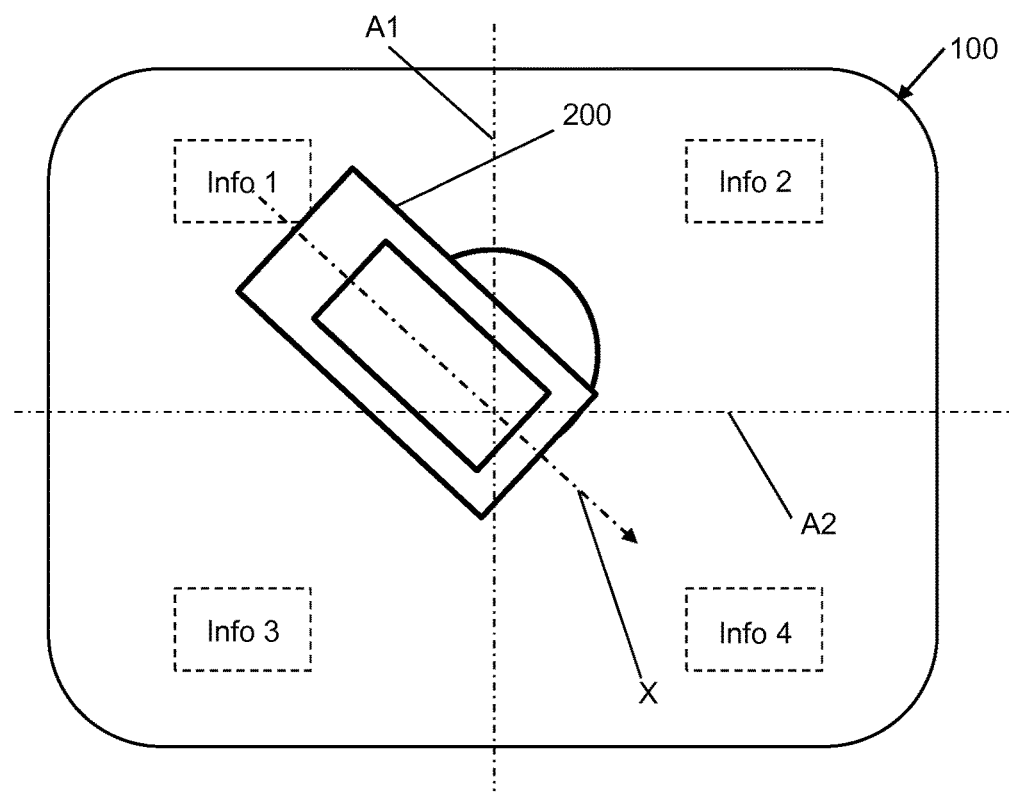

FIG. 1 shows a tag 100 including a plurality of information units is attached.

The tag 100 is typically installed on a support, for example a wall, a table, an advertising totem pole or column.

Tag 100 is typically an NFC tag, wherein a plurality of information units have been embedded. The information units are in the NDEF code, which may correspond, for example, to URLs to be opened, applications to be downloaded and/or executed, or functions to be executed in a communication portable device. According to other embodiments of the present invention the information is embedded in the tag using another type of code, being the type of information coding inside the tag not the specific object of this invention.

In the embodiment of FIG. 1, NFC tag 100 includes four information units. According to other embodiments (not shown) of the present invention, NFC tag 100 include a different number of information units.

NFC tag 100 also includes the information about the number of information units which are included in the tag 100.

NFC tag 100 has a rectangular shape delimited by two base edges L1, L2, respectively upper and lower and two lateral edges L3, L4, respectively left end right. NFC tag 100 also include an angular zero reference 101, i.e. a mark of triangular shape or, according to other different embodiments, of other shape. The angular zero reference 101 defines a reference axis A1 of the tag 100, passing through the angular zero reference 101 and the center of the tag 100.

Figure 6:
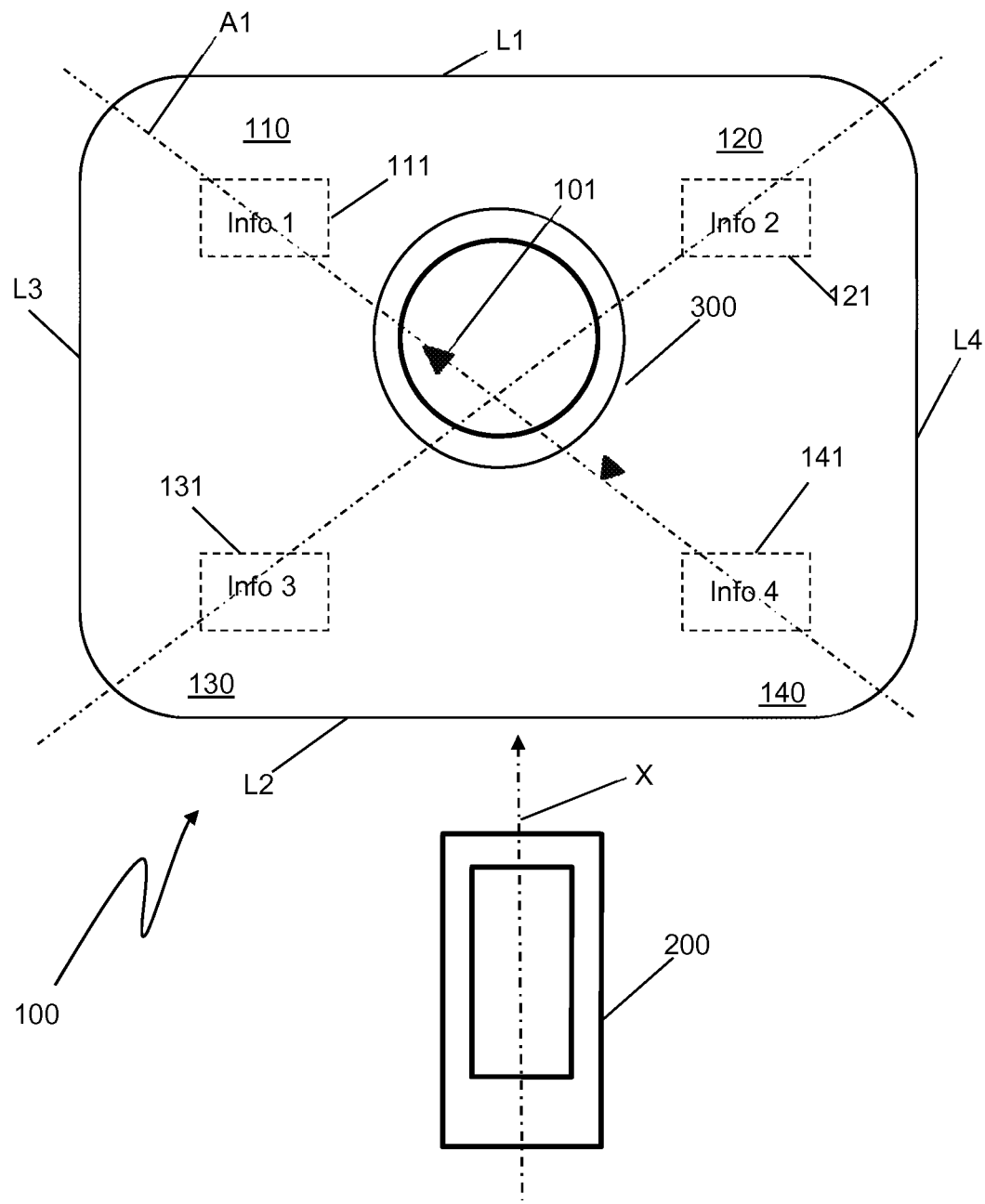
FIG. 6 shows a schematical view of an alternative embodiment of the system in FIG. 1.

With reference to the alternative embodiment in FIG. 6 the angular zero reference 101 and reference axis A1 are oriented along one of the diagonals of the rectangular tag 100. In general, with reference to other alternative embodiments of the present invention another position of the angular zero reference 101 and, therefore, another orientation of the reference axis A1, can be chosen. According to other embodiment of the present invention the shape of the tag 100 is not rectangular.

With reference to the embodiment in FIG. 1, with respect to the angular zero reference 101 and the reference axis A1, the NFC tag 100 is virtually divided in four angular sector 110, 120, 130, 140 around the centre of the NFC tag 100, i.e. in a number of angular sectors corresponding to the number of information units embedded in the NFC tag 100. For the complete round angle 300 around the centre of the NFC tag 100, an angular interval ranging from −180° to 180° clockwise is defined, where position 0° corresponds to the angular zero reference 101, subinterval −90° to 0° corresponds to the first angular sector 110, subinterval 0° to 90° corresponds to the second angular sector 120, subinterval −180° to −90° corresponds to the third angular sector 130 and subinterval 90° to 180° corresponds to the fourth angular sector 140. In each angular sector 110, 120, 130, 140, the NFC tag 100 comprises a correspondent text tag 111, 121, 131, 141 defining the names (four names "Info 1", "Info 2", "Info 3", "Info 4" in the embodiment shown in FIG. 1) of the information units embedded in NFC tag 100. For example the strings "Info 1", "Info 2", "Info 3", "Info 4" may be the URLs, or names of applications, or names of functions corresponding to the four NDEF codes embedded in the NFC tag 100.

With reference to the embodiment in FIG. 6, for the complete round angle 300 around the centre of the NFC tag 100, an angular interval ranging from −180° to 180° clockwise is defined, where position 0° corresponds to the angular zero reference 101, subinterval −45° to 45° corresponds to the position of the first text tag 111, subinterval 45° to 135° corresponds to the to the position of the second text tag 121, subinterval −135° to −45° corresponds to the position of the third text tag 131 and subintervals 135° to 180° and −180° to −135° corresponds to the position of the fourth text tag 141.

FIGS. 1 to 6 also shows a communication portable device 200, having an axis X oriented from bottom to top of the communication portable device 200. "Bottom and "top" are referred to the normal "portrait" orientation of a screen 201 of the communication portable device 200, when in use. The communication portable device 200 includes an NFC device configured to communicate by means of the NFC standard with the NFC tag 100. The NFC device is a standard and known-in-the-art device and for this reason it is not described more in detail. The communication portable device 200 further includes a sensor, for example an accelerometer, for determining a position and/or orientation of the axis X. The communication portable device 200 includes a controller associated with the NFC device and configured in order to execute a method for managing the communication between the communication portable device 200 and the NFC tag 100, according to the present invention.

With reference to FIGS. 2 to 5, a method for managing the communication between the communication portable device 200 and the NFC tag 100 includes the following sequence of steps:

in a first step the communication portable device 200 is brought in proximity (within a range of 4 cm, according to the NFC standard) of the NFC tag 100, in order that a communication can be established between the NFC device and NFC tag 100. The communication portable device 200 is to be oriented parallel or only slightly inclined (i.e. less than 10°, according to possible embodiments of the present invention) to the NFC tag 100 in order that the communication between communication portable device 200 and NFC tag 100 is not disturbed, then, in a second step, the method recognizes the number of information units included in the NFC tag 100 and acquire the position of the angular zero reference 101, then, in a third step, the method discretizes a round angle 300 on the NFC tag 100 in a plurality of angular sectors 110, 120, 130, 140 the number of angular sectors being equal to the number of information units comprised in the NFC tag 100, then, in a fourth step, the method associates each angular sector 110, 120, 130, 140 to one information unit in the NFC tag 100, then, in a fifth step, the method recognizes the angular sector towards which the axis X of the communication portable device 200 is oriented by measuring its absolute angular distance from angular zero reference 101, finally, in a sixth step, the method reads in the NFC tag 100 only the information unit associated to the recognized angular sector. In each of FIGS. 2 to 5 the method respectively recognizes and reads the information unit associated with each angular sector 110, 120, 130, 140.

If, according to one possible embodiment of the invention, the information units are URLs, then in FIG. 1 the URL "Info 1", is recognized and read, in order to be automatically opened in the web browser included in the communication portable device 200.

The above method is in an analogous way applied also to the alternative embodiment of FIG. 6.

According to an alternative embodiment of the present invention, not represented in the attached figures, the angular zero reference 101 is not present on the tag 100 and therefore its position is not acquired in the second step of the method. In such cases, an angular zero reference is identified during the first or second step of the method by orienting the portable device 200 according to one of the edge of tag 100, for example, with reference to the rectangular tag of the attached figures, by orienting the portable device 200 parallel to the two base edges L1, L2 or to the two lateral edges L3, L4, and memorizing the orientation of axis X as an angular zero reference axes.

According to an alternative embodiment of the present invention, acquiring the position of the angular zero reference 101 is not necessary, the axis A1 corresponding to a vertical axis, oriented from the ground upwards, of the location where tag 100 is installed. In such cases, the installation of the tag 100 has to be done with greater care, on a vertical plane, for example a wall. In the case of the rectangular tag lateral edges L3, L4 have to be parallel to the vertical direction and positions of base edges L1, L2 have not to be inverted with respect to one another, as this would cause "Info 4" to be recognized as "Info 1" and "Info 3" to be recognized as "Info 2". According to this embodiment, in a fifth step, the method recognizes the angular sector towards which the axis X of the communication portable device 200 is oriented by measuring its absolute angular distance from the vertical direction.

A great number of applications are possible for the method of the present invention. For example in the field of public transportation two possible applications are:

a tag 100 at a bus stop, wherein "Info 1", "Info 2", "Info 3", "Info 4" contains the URL of a website, or the link to a software application for portable devices, providing direct information four different bus lines, respectively. For example the information could be the respective timetable of the respective bus line or, combining the information about the location of the portable device, the time when the next bus of the respective line is expected to pass at that bus stop. At the bus stop the user simply orient the portable device 200 towards one of the text tag 111, 121, 131, 141 to obtain the desired information.

a tag 100 at a bus stop, having combined information, for example six units information, the first four units corresponding to a bus line and the other two to a pair of information which can be related to each bus line, for example timetable and line map. At a bus stop the user, for example, simply orient the portable device 200 first towards the text tag "map" and then towards the text "Bus line 1" to get the bus 1 map visualized on the portable device 200.

REFERENCE NUMERALS

100 NFC tag,
101 angular zero reference,
110, 120, 130, 140 angular sectors,
200 communication portable device
201 screen
300 round angle
X axis of communication portable device

The invention claimed is:

1. A method for managing communication between a communication portable device including a Near Field Communication (NFC) device and a NFC tag including a plurality of information units, the method comprising:
  determining an orientation of an axis of the communication portable device;
  recognizing an angular sector toward which the axis of the communication portable device is oriented by measuring an absolute angular distance from an angular zero reference;
  and
    enabling the communication portable device to read a selected portion of the plurality of information units, wherein the selected portion depends on the recognized angular sector and the orientation of the axis of the communication portable device.

2. The method according to claim 1, further comprising:
  discretizing a round angle in a plurality of angular sectors, a number of the plurality of angular sectors being equal to a number of the plurality of information units comprised in the NFC tag;
  associating each angular sector to one information unit;
  reading only a particular information unit associated to the recognized angular sector.

3. The method according to claim 2, wherein the step of recognizing the angular sector further comprises:
  acquiring an angular zero reference from the NFC tag.

4. The method according to claim 3, wherein the angular zero reference is a physical mark on the NFC tag.

5. The method according to claim 3, wherein the angular zero reference is acquired by orienting the communication portable device parallel to one edge of the NFC tag.

6. The method according to claim 3, wherein the angular zero reference is a vertical axis of a location where the NFC tag is installed.

7. A communication portable device comprising:
 a NFC device configured to read a plurality of information units from a NFC tag;
 a sensor configured to determine an orientation of an axis of the communication portable device; and
 a controller, associated with the NFC device, configured to enable said NFC device to recognize an angular sector toward which the axis of the communication portable device is oriented by measuring an absolute angular distance from an angular zero reference, and read a selected portion of the plurality of information, wherein the selected portion depends on the recognized angular sector and the orientation of the axis of the communication portable device.

8. A communication system including the communication portable device according to claim 7 and the NFC tag including the plurality of information units.

\* \* \* \* \*